United States Patent
Fruehling et al.

(10) Patent No.: US 10,493,722 B2
(45) Date of Patent: *Dec. 3, 2019

(54) HERMETICALLY SEALED MOLECULAR SPECTROSCOPY CELL WITH DUAL WAFER BONDING

(71) Applicant: TEXAS INSTRUMENTS INCORPORATED, Dallas, TX (US)

(72) Inventors: Adam Joseph Fruehling, Garland, TX (US); Juan Alejandro Herbsommer, Allen, TX (US); Benjamin Stassen Cook, Addison, TX (US); Simon Joshua Jacobs, Lucas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/195,308

(22) Filed: Nov. 19, 2018

(65) Prior Publication Data

US 2019/0084271 A1 Mar. 21, 2019

Related U.S. Application Data

(63) Continuation of application No. 15/698,346, filed on Sep. 7, 2017, now Pat. No. 10,131,115.

(51) Int. Cl.
*H04M 1/00* (2006.01)
*H04B 1/38* (2015.01)
(Continued)

(52) U.S. Cl.
CPC .............. *B32B 7/04* (2013.01); *H04B 1/38* (2013.01); *H04B 1/3827* (2013.01); *G04F 5/14* (2013.01); *H04B 2001/3894* (2013.01)

(58) Field of Classification Search
None
See application file for complete search history.

(56) References Cited

U.S. PATENT DOCUMENTS

| 4,147,431 A | 4/1979 | Mann |
|---|---|---|
| 4,826,616 A | 5/1989 | Tanino |
| (Continued) | | |

FOREIGN PATENT DOCUMENTS

| JP | 6428974 | 1/1989 |
|---|---|---|
| WO | 2014037016 | 3/2014 |
| WO | 2016161216 | 10/2016 |

OTHER PUBLICATIONS

International Search Report for PCT/US2018/050253 dated Jan. 10, 2019.

(Continued)

*Primary Examiner* — Tuan A Tran
(74) *Attorney, Agent, or Firm* — Michael A. Davis, Jr.; Charles A. Brill; Frank D. Cimino

(57) ABSTRACT

A method includes forming a plurality of layers of an oxide and a metal on a substrate. For example, the layers may include a metal layer sandwiched between silicon oxide layers. A non-conductive structure such as glass is then bonded to one of the oxide layers. An antenna can then be patterned on the non-conductive structure, and a cavity can be created in the substrate. Another metal layer is deposited on the surface of the cavity, and an iris is patterned in the metal layer to expose the one of the oxide layers. Another metal layer is formed on a second substrate and the two substrates are bonded together to thereby seal the cavity.

12 Claims, 5 Drawing Sheets

(51) Int. Cl.
*B32B 7/04* (2019.01)
*H03H 9/15* (2006.01)
*H04B 1/3827* (2015.01)
*G04F 5/14* (2006.01)

(56) References Cited

U.S. PATENT DOCUMENTS

| | | | |
|---|---|---|---|
| 5,107,231 A | 4/1992 | Knox | |
| 5,198,786 A | 3/1993 | Russell et al. | |
| 5,218,373 A | 6/1993 | Heckaman et al. | |
| 5,412,186 A | 5/1995 | Gale | |
| 5,459,324 A | 10/1995 | Fima | |
| 5,821,836 A | 10/1998 | Katehi et al. | |
| 6,131,256 A * | 10/2000 | Dydyk | H03H 3/04 29/25.35 |
| 6,236,366 B1 | 5/2001 | Yamamoto et al. | |
| 6,362,706 B1 | 3/2002 | Song et al. | |
| 6,498,550 B1 | 12/2002 | Miller et al. | |
| 6,630,359 B1 | 10/2003 | Caillat et al. | |
| 6,670,866 B2 * | 12/2003 | Ella | H03H 9/0095 310/366 |
| 6,842,088 B2 * | 1/2005 | Yamada | B06B 1/0644 310/322 |
| 6,989,723 B2 * | 1/2006 | Komuro | H03H 3/04 333/133 |
| 6,998,691 B2 | 2/2006 | Baugh | |
| 7,388,454 B2 * | 6/2008 | Ruby | H03H 3/02 310/322 |
| 7,408,428 B2 * | 8/2008 | Larson, III | H03H 9/02102 310/346 |
| 8,098,208 B2 * | 1/2012 | Ficker | G06K 19/07749 340/572.7 |
| 8,268,642 B2 * | 9/2012 | Yoshitomi | H01L 27/1225 257/E21.333 |
| 8,293,661 B2 * | 10/2012 | Yamazaki | H01L 21/3003 438/585 |
| 8,586,178 B2 * | 11/2013 | Schwanke | C03C 15/00 216/56 |
| 9,436,902 B1 * | 9/2016 | Koepp | G06K 19/07752 |
| 9,529,334 B2 | 12/2016 | Herbsommer et al. | |
| 9,735,754 B2 * | 8/2017 | Shin | H03H 9/02102 |
| 2002/0038989 A1 * | 4/2002 | Larson, III | H03H 3/04 310/330 |
| 2002/0068018 A1 | 6/2002 | Pepper et al. | |
| 2002/0098611 A1 * | 7/2002 | Chang | B81C 1/00246 438/50 |
| 2003/0015707 A1 * | 1/2003 | Bosco | H01L 21/8258 257/73 |
| 2003/0048500 A1 | 3/2003 | Fala et al. | |
| 2003/0107459 A1 | 6/2003 | Takahashi et al. | |
| 2004/0142484 A1 | 7/2004 | Berlin et al. | |
| 2004/0166577 A1 | 8/2004 | Storek et al. | |
| 2005/0023932 A1 * | 2/2005 | Inoue | H03H 9/02102 310/327 |
| 2006/0022761 A1 | 2/2006 | Abeles | |
| 2006/0076632 A1 | 4/2006 | Palmateer et al. | |
| 2006/0144150 A1 | 7/2006 | Wu | |
| 2007/0189359 A1 | 8/2007 | Chen et al. | |
| 2008/0319285 A1 | 12/2008 | Hancock | |
| 2010/0182102 A1 * | 7/2010 | Kuypers | H03H 9/02228 333/197 |
| 2010/0259334 A1 | 10/2010 | Briggs | |
| 2010/0327701 A1 * | 12/2010 | Grannen | H03H 3/04 310/346 |
| 2011/0140971 A1 * | 6/2011 | Schwanke | C03C 15/00 343/700 MS |
| 2012/0266681 A1 | 10/2012 | Baumann et al. | |
| 2013/0176703 A1 | 7/2013 | Hopper et al. | |
| 2014/0155295 A1 | 6/2014 | Hendson et al. | |
| 2014/0210835 A1 | 7/2014 | Hong et al. | |
| 2014/0347074 A1 | 11/2014 | Nadeau | |
| 2014/0368377 A1 | 12/2014 | Nadeau et al. | |
| 2014/0373599 A1 | 12/2014 | Trombley et al. | |
| 2015/0144297 A1 | 5/2015 | Toivonen et al. | |
| 2015/0123748 A1 | 7/2015 | Stevenson | |
| 2015/0277386 A1 | 10/2015 | Passilly et al. | |
| 2016/0091663 A1 | 3/2016 | Taylor | |
| 2016/0233178 A1 | 8/2016 | Lamy et al. | |
| 2017/0073223 A1 | 3/2017 | Nasiri et al. | |
| 2017/0125660 A1 | 5/2017 | Stephanou et al. | |
| 2017/0130102 A1 | 5/2017 | Campbell et al. | |
| 2018/0159547 A1 | 6/2018 | Herbsommer et al. | |

OTHER PUBLICATIONS

Alvarez, A.L. et al; "The Application of Microencapsulation Techniques in the Treatment of Endodontic and Periodontal Diseases" Pharmaceutics; 2011 abstract p. 540-548.

Steinberg, D. et al; "A New Degradable Controlled Release Device for Treatment of Periodontal Disease: In Vitro Release Study"; J. Periodontology; 1990; p. 393 lines 1-17; p. 394 col. 1 lines 5-14.

Xiong, R. et al.; "Towards Theranostic Multicompartment Microcapsules: in situ Diagnostics and Laser-induced Treatment", Theranostics; 2013; pp. 145-149.

International Search Report for PCT/US2018/049513 dated Nov. 15, 2018.

International Search Report for PCT/US2018/049940 dated Dec. 13, 2018.

International Search Report for PCT/US2018/049949 dated Dec. 13, 2018.

International Search Report for PCT/US2018/047105 dated Dec. 27, 2018.

International Search Report for PCT/US2018/049943 dated Dec. 27, 2018.

\* cited by examiner

HERMETICALLY SEALED MOLECULAR SPECTROSCOPY CELL WITH DUAL WAFER BONDING

CROSS-REFERENCE TO RELATED APPLICATIONS

This application is a continuation of U.S. patent application Ser. No. 15/698,346 filed Sep. 7, 2017, which is fully incorporated herein by reference.

BACKGROUND

Various applications may include a sealed chamber formed in a semiconductor structure. In one particular application, a chip-scale atomic clock may include a selected vapor at a low pressure in a sealed chamber. Forming such structures can be a challenge.

SUMMARY

In one embodiment, a method includes forming a plurality of layers of an oxide and a metal on a substrate. For example, the layers may include a metal layer sandwiched between silicon oxide layers. A non-conductive structure such as glass is then bonded to one of the oxide layers. An antenna can then be patterned on the non-conductive structure, and a cavity can be created in the substrate. Another metal layer is deposited on the surface of the cavity, and an iris is patterned in the metal layer to expose the one of the oxide layers. Another metal layer is formed on a second substrate and the two substrates are bonded together to thereby seal the cavity. The method also may include the deposition or bonding of further dielectric and metal layers and their subsequent patterning on the topmost surface to improve the radio frequency (RF) performance of antenna, transmission line structures, and electromagnetic bandgap structures.

In another embodiment, a device includes a first substrate that includes a cavity. The device also includes a first oxide layer on a surface of the first substrate, a first metal layer on a surface of the first oxide layer opposite the first substrate, and a second oxide layer on a surface of the first metal layer opposite the first oxide layer. The device further includes a non-conductive structure bonded to a surface of the second oxide layer opposite the first metal layer, a first antenna patterned on a surface of the non-conductive structure opposite the second oxide layer, and a second substrate bonded to the first substrate to thereby seal the cavity. The cavity in this embodiment extends from an interface between the first and second substrates to the second oxide layer.

Yet another embodiment is directed to a device that includes a first semiconductor substrate in which a cavity has been formed. The device also includes a first oxide layer on a surface of the first semiconductor substrate, a first metal layer on a surface of the first oxide layer opposite the first semiconductor substrate, and a second oxide layer on a surface of the first metal layer opposite the first oxide layer. The device further includes a glass sheet bonded to a surface of the second oxide layer opposite the first metal layer, first and second antennas patterned on a surface of the glass sheet opposite the second oxide layer, a second semiconductor substrate bonded to the first semiconductor substrate to thereby seal the cavity, and a transceiver electrically coupled to the first and second antennas and configured to inject a transmit signal into the cavity through the first antenna. The cavity contains dipolar molecules and has an internal pressure of less than, for example, 0.15 mbars. The transceiver is configured also to generate an error signal based on the transmit signal and a receive signal from the second antenna and dynamically adjust a frequency of the transmit signal based on the error signal.

DETAILED DESCRIPTION OF EXAMPLE EMBODIMENTS

Figure 1A:
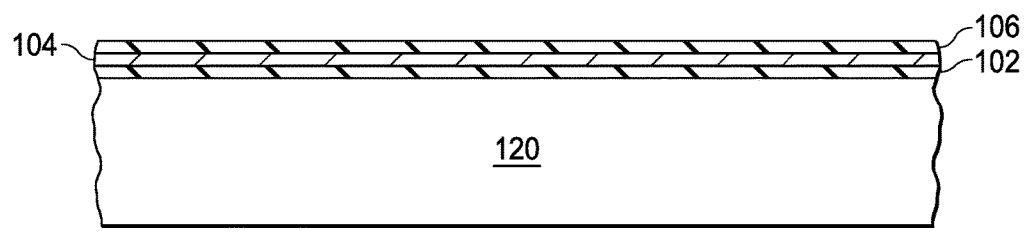
FIGS. 1A-1I illustrate a sequence of processing operations in one embodiment to form a hermetically sealed cavity.

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

The disclosed embodiments of the present disclosure include techniques to fabricate a hermetically sealed cavity in a substrate. A structure containing a substrate with the cavity may be used in numerous applications. One illustrative use is as a millimeter wave chip scale atomic clock. The cavity may contain a plurality of dipolar molecules (e.g., water molecules) at a relatively low pressure. For some embodiments, the pressure may be approximately 0.1 mbarr for water molecules. If argon molecules were used, the pressure may be several atmospheres. The hermetically sealed cavity may contain selected dipolar molecules at a pressure chosen to optimize the amplitude of a signal absorption peak of the molecules detected at an output of the cavity. An electromagnetic signal may be injected through aperture into the cavity. Through closed-loop control, the frequency of the signal is dynamically adjusted to match the frequency corresponding to the absorption peak of the molecules in the cavity. The frequency produced by quantum rotation of the selected dipolar molecules may be unaffected by circuit aging and may not vary with temperature or other environmental factors.

While a variety of materials and manufacturing operations can be employed, one illustrative method may include forming a plurality of layers of an oxide and a metal on a substrate. For example, the layers may include a metal layer sandwiched between silicon oxide layers. A non-conductive structure such as glass is then bonded to one of the oxide layers. An antenna can then be patterned on the non-conductive structure, and a cavity can be created in the substrate. Another metal layer is deposited on the surface of the cavity, and an iris is patterned in the metal layer to expose the one of the oxide layers. Another metal layer is formed on a second substrate and the two substrates are bonded together to thereby seal the cavity.

FIGS. 1A-1I illustrate a sequence of process steps to fabricate a hermetically sealed cavity in accordance with an embodiment. At FIG. 1A, a first oxide layer 102 is formed on a first substrate 120. A first metal layer 104 is formed on a surface of the first oxide layer 102 opposite the first substrate 120. The first metal layer 104 may comprise copper or another suitable metal. A second oxide layer 106 is formed on a surface of the first metal layer 104 opposite the first oxide layer 102. The oxide layers may comprise silicon oxide and layers 102-106 may be formed in accordance with any suitable semiconductor process operations. The substrate 120 is a semiconductor substrate (e.g., silicon) in some embodiments, but can be other than a semiconductor substrate in other embodiments, such as a ceramic material or a metallic cavity.

Figure 1B:
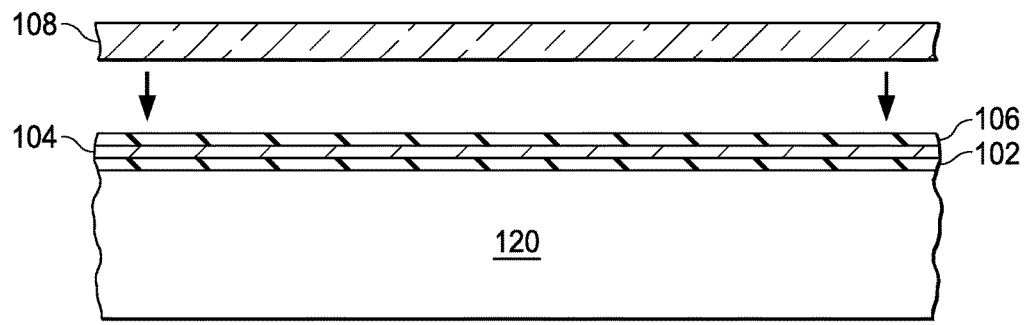

At FIG. 1B, a non-conductive structure 108 is bonded to a surface of the second oxide layer 106 opposite the first metal layer 104. In one example, the non-conductive structure comprises glass (e.g., 130 micrometers thick), but can include other types of materials such as ceramic or silicon in other embodiments. The process to bond the non-conductive structure 108 to the second oxide layer 106 may comprise an anodic, fusion, eutectic solder, transition liquid phase (TLP), cofiring, or other suitable bonding processes.

Figure 1C:
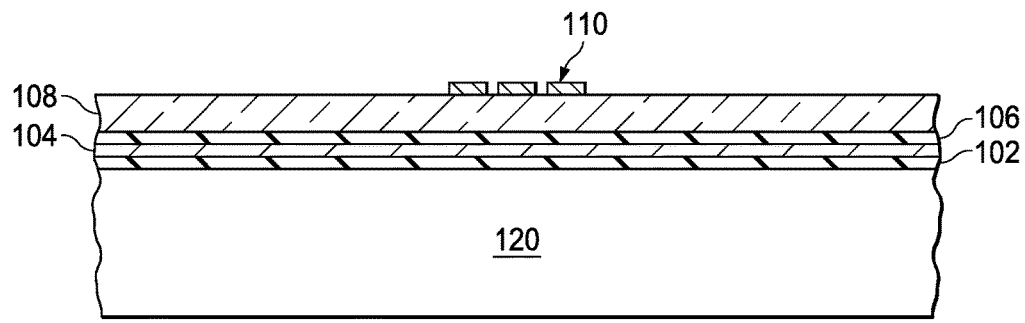
Figure 1D:
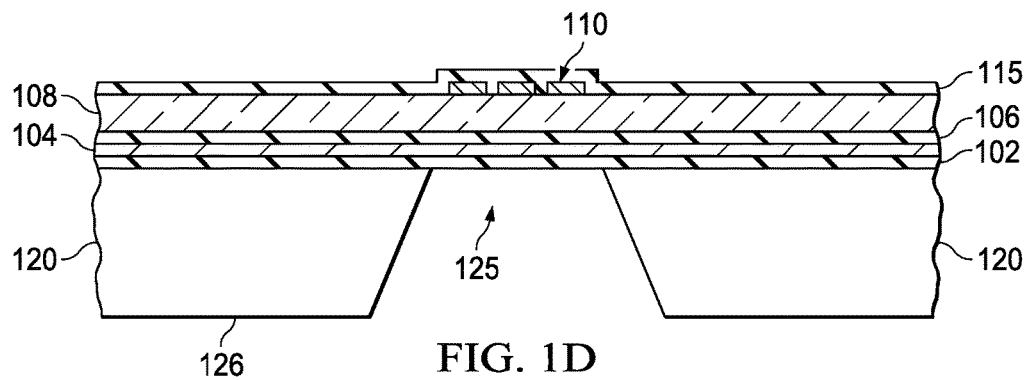
Figure 1E:
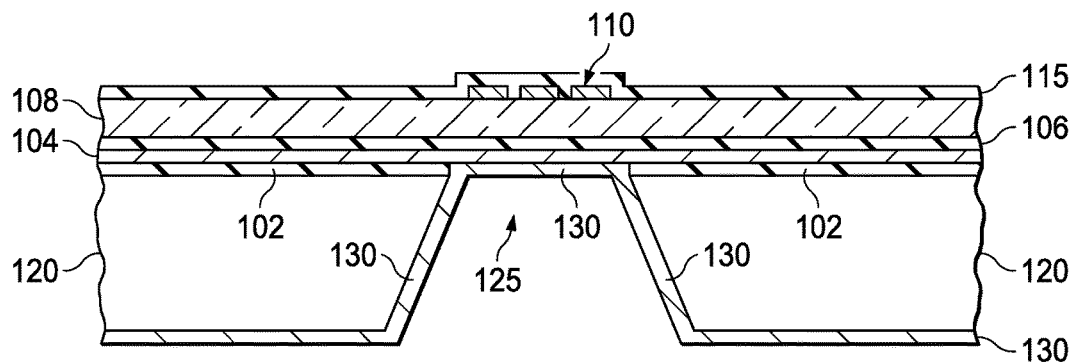

FIG. 1C illustrates that an antenna 110 has been patterned on a surface of the non-conductive structure 108. The antenna 110 comprises a conductive material such as copper or gold and an electrical signal can be provided to the antenna or received from the antenna. In some embodiments, one antenna is used to both transmit and receive signals. In other embodiments, a pair of antennas is patterned on the non-conductive structure 108, and one antenna is used to inject a signal into the cavity and another antenna is used to receive a signal from the cavity. In such examples, the antennas may be located at or near opposite ends of the cavity. FIG. 1D illustrates that an oxide layer 115 is formed on a surface of the non-conductive structure 108. Oxide layer 115 also covers the antenna 110 and functions to protect the antenna during subsequent process operations. FIG. 1D also illustrates that a cavity 125 has been created in the substrate 120. The cavity 125 may be wet etched into the substrate 120 using a suitable wet etchant such as potassium hydroxide (KOH) or tetramethylammonium hydroxide (TMAH). Alternatively, the cavity 125 can be formed by way of reactive-ion etching (RIE), deep reactive-ion etching (DRIE), or isotropic etching. The cavity 125 is etched from the surface 126 of the substrate 120 opposite the first oxide layer 102 to the first oxide layer 102, thereby exposing a portion of the first oxide layer 102. FIG. 1E illustrates that another metal layer 130 has been deposited on a surface of the substrate 120 opposite the first oxide layer 102. The metal layer 130 also is deposited in the cavity 125 as shown and may be sputter deposited (e.g., 40 nm TaN per micrometer of copper).

Figure 1F:
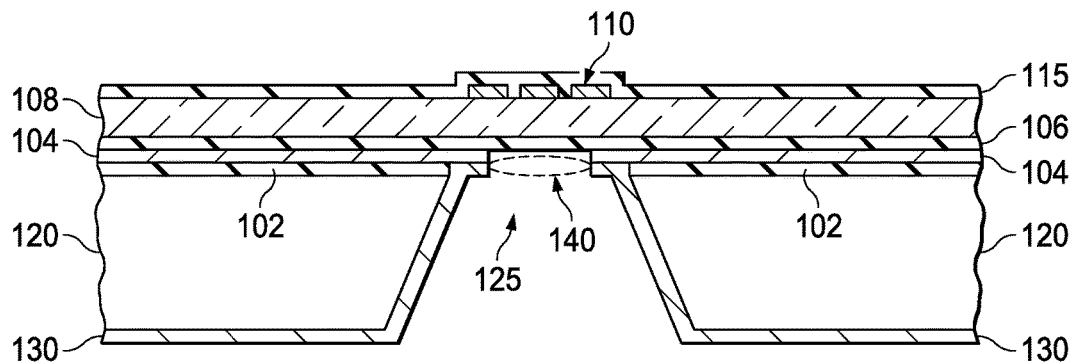

FIG. 1F illustrates that an iris 140 is created in the metal layer 130 within the cavity 125. The iris 140 is patterned (e.g., by wet etching, dry etching, liftoff, etc.) in the metal layer 130 and exposes at least a portion of the second oxide layer 130. The iris 140 permits the RF energy from the incident radio frequency (RF) signal provided by the antenna 110 is able to penetrate through the iris 140 and into the cavity 125, and back out again through another iris formed in the cavity and associated with another antenna (noted above).

Figure 1G:
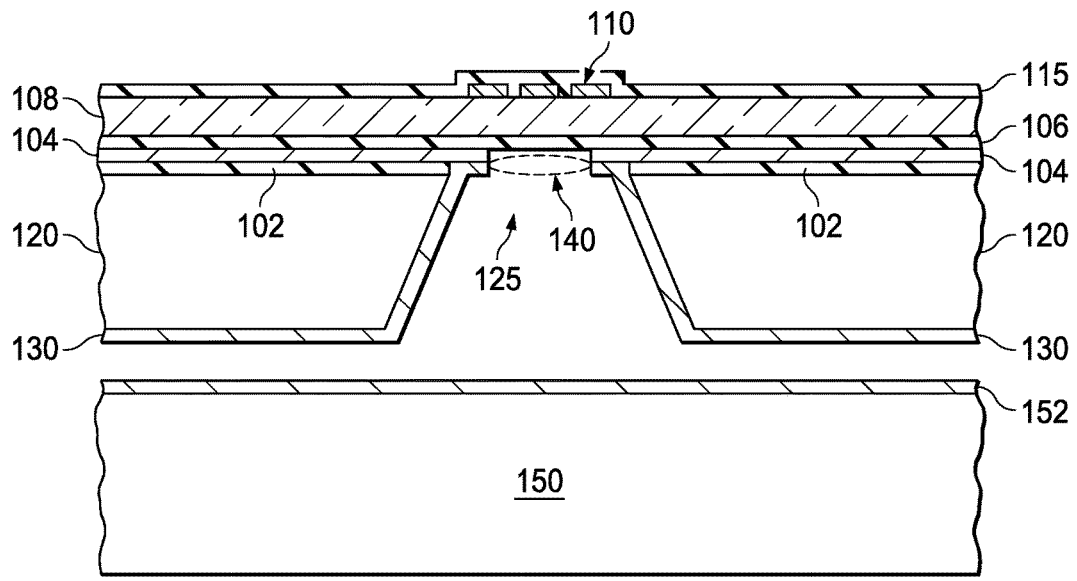
Figure 1H:
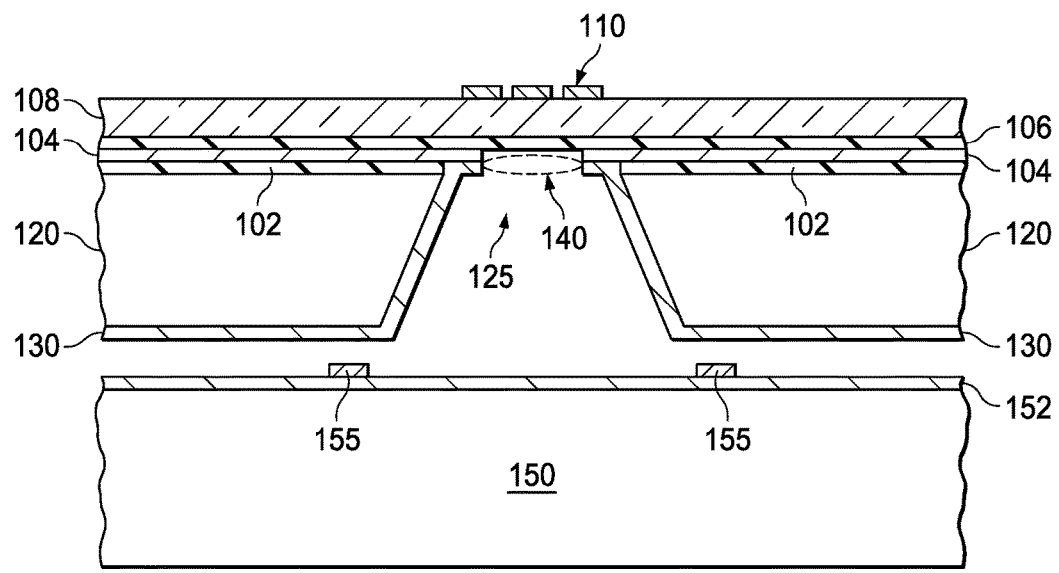
Figure 1I:
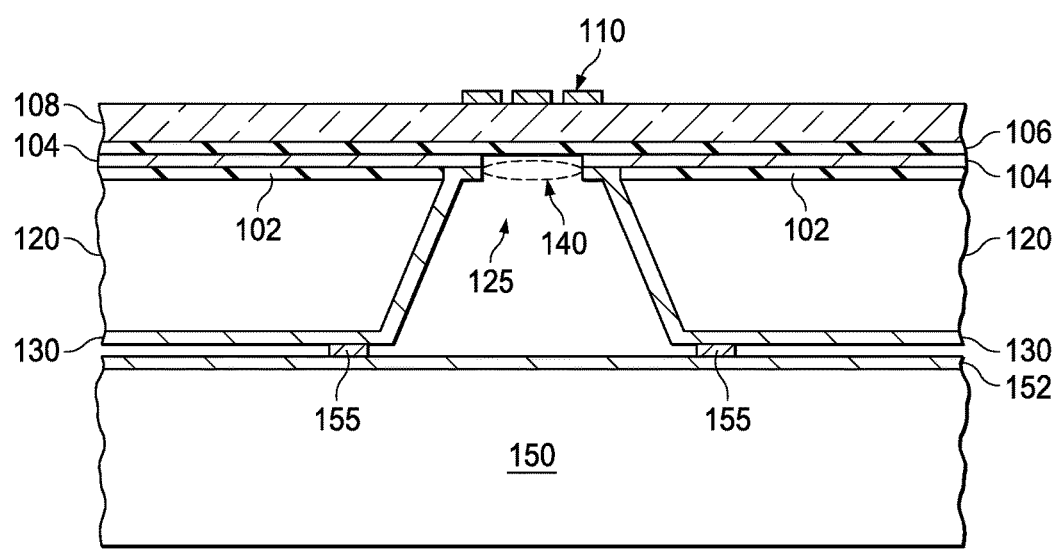

FIG. 1G shows a second substrate 150 and a metal layer 152 formed thereon. The substrate 150 may comprise the same or different material as substrate 120. In one example, the substrate 150 comprises a semiconductor substrate such as a silicon wafer, but can be other than a semiconductor material in other examples. FIGS. 1H and 1I illustrate that bonding structures 155 are deposited and patterned on either or both of the substrates 120 and 150. In one example, the bonding structures comprise a gold, aluminum, silicon or other types of material that form an alloy when heated to a suitable temperature. FIG. 1I illustrates the resulting device which includes a hermetically sealed cavity. Dipolar molecules (e.g., water molecules) may be trapped inside the cavity 125 and at an internal pressure of less than approximately 0.15 mbars (e.g., 0.1 mbars).

Figure 2:
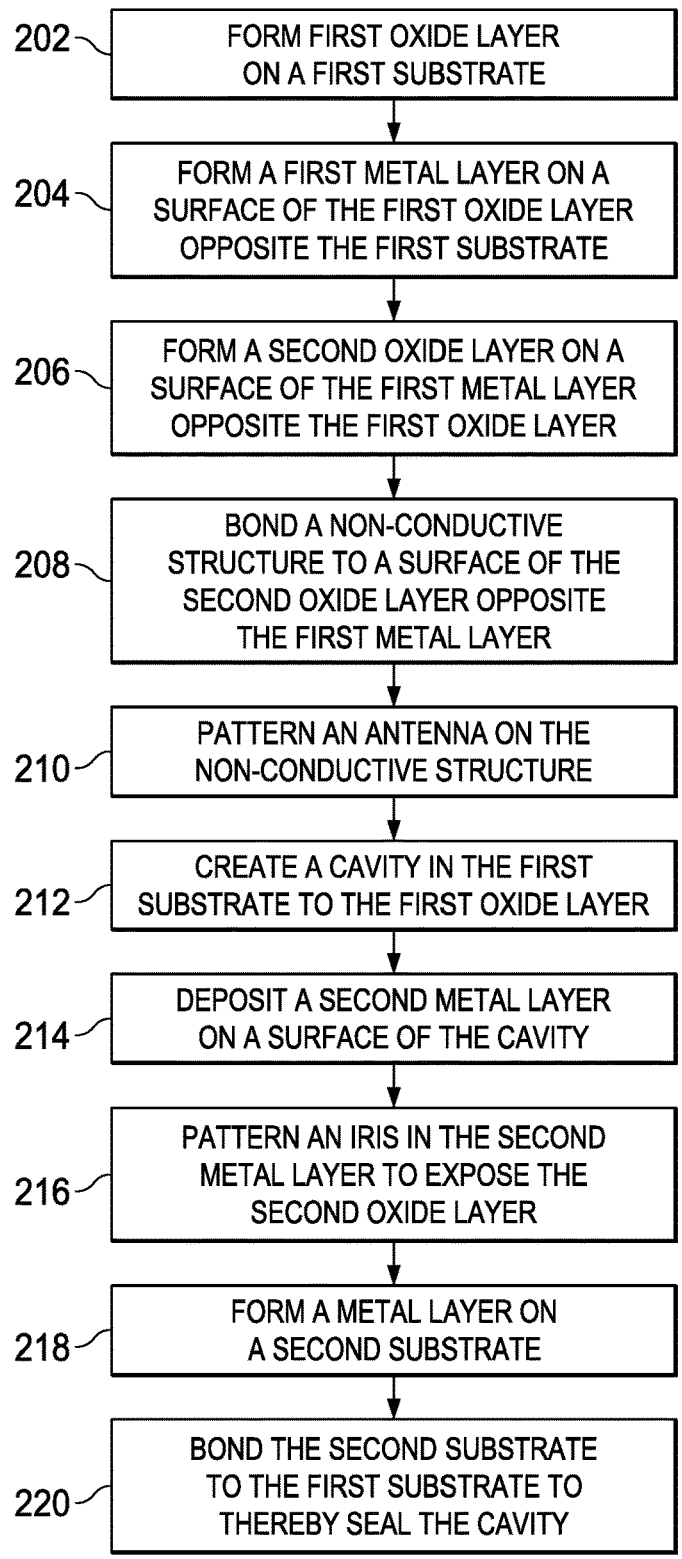
FIG. 2 illustrates a method flow chart to form a hermetically sealed cavity in accordance with various embodiments.

The flow chart of FIG. 2 illustrates a method in accordance with an example. The operations may be performed in the order shown, or in a different order. Further, the operations may be performed sequentially, or two or more of the operations may be performed concurrently.

At 202, the method includes forming a first oxide layer on a first substrate (e.g., a semiconductor substrate such as a wafer). The illustrative method then includes (204) forming a first metal layer (e.g., copper) on a surface of the first oxide layer opposite the first substrate. At 206, the method includes forming a second oxide layer on a surface of the first metal layer opposite the first oxide layer. As such, a metal layer is created sandwiched between to oxide layers.

At 208, the method includes bonding a non-conductive structure (e.g., glass) to a surface of the second oxide layer opposite the first metal layer, and at 210 patterning an antenna (e.g., antenna 110) on the non-conductive structure. A cavity is then created at 212 (e.g., by a wet etching process) in the substrate. The cavity extends from one surface of the substrate to the opposing surface (and thus to the first oxide layer).

At 214, a second metal layer is deposited in the interior surface of the cavity and on a surface of the first substrate outside the cavity. At 216, the method includes patterning an iris in the second metal layer to expose the second oxide layer. A metal layer is formed (218) on a second substrate (e.g., another semiconductor wafer) and the first and second substrates are then bonded together at 220 to thereby seal the cavity. In one embodiment, the substrates are bonded via eutectic bonds, or other suitable bonding techniques.

Figure 3:
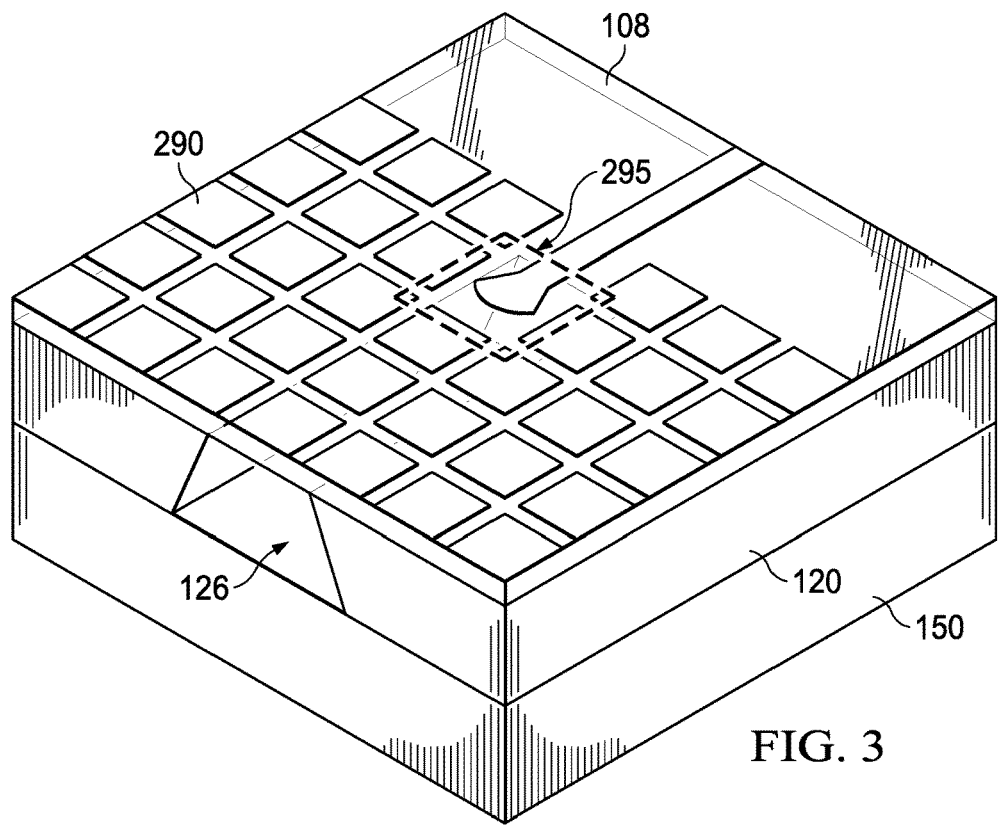
FIG. 3 shows a cross-sectional view of the hermetically sealed cavity of various embodiments.

FIG. 3 shows a cross-sectional view of a structure in accordance with the disclosed embodiments. The structure may comprise a millimeter wave chip scale atomic clock. Substrate 120 is shown bonded to substrate 150 with a hermetically sealed cavity 125 formed in the substrate 120 and sealed at least in part by substrate 150. The non-conductive structure (e.g., glass) 108 is shown bonded to the substrate 120. A launch structure 295 may comprise the antenna 110 described above and also a transmission line, and electromagnetic energy is permitted to pass through the non-conductive structure 108 from the launch structure 295 into the cavity 125. An electronic bandgap (EBG) structure 290 also is shown deposited and patterned on a surface of the non-conductive structure 108. In operation, the EBG structure 290 attenuates electromagnetic wave coupling along the outer surface of the non-conductive structure 108 between the antennas. The EBG structure 290 helps to force the energy from the input signal received through an antenna (e.g., antenna 110) into the cavity 125. Layer 104 provides a common ground plane for all RF structures external to the cavity 125. In addition, it limits propagation of waves travelling in layer 120. The dimensions of the waveguide, antenna, EBG, and size and positioning of the iris 140 are all design considerations based on the chosen molecular species inside the cavity and the wavelength of the interrogation waveform within the cavity. The required bandwidth of the structure depends upon the fabrication tolerances achievable in manufacturing.

Figure 4:
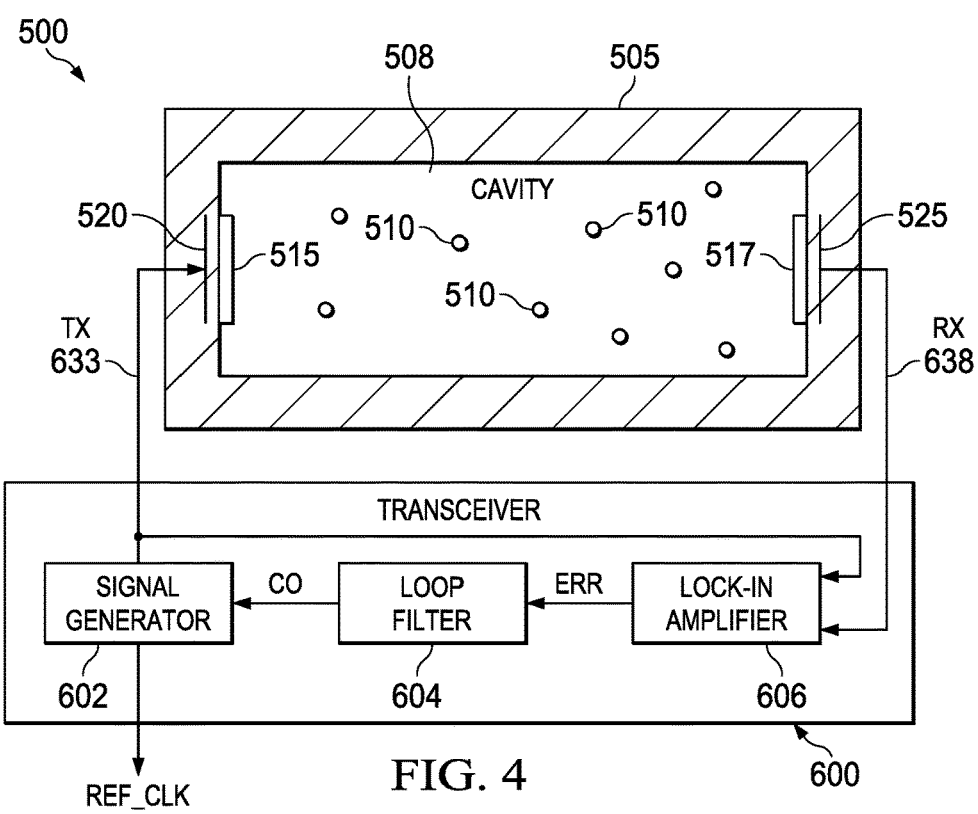
FIG. 4 shows a block diagram for a clock generator in accordance with various embodiments.

FIG. 4 shows a block diagram for a clock generator 500 in accordance with various embodiments. The clock generator 500 is a millimeter wave atomic clock that generates a reference frequency based on the frequency of quantum rotation of selected dipolar molecules contained in a hermetically sealed cavity 102 formed in semiconductor material. The reference frequency produced by quantum rotation of the selected dipolar molecules is unaffected by circuit aging and does not vary with temperature or other environmental factors.

The clock generator 500 of FIG. 4 includes a vapor cell 505 formed in this example from substrates as described above. The cell 505 includes a cavity 508 with a sealed interior enclosing a dipolar molecule material gas, for example, water ($H_2O$) or any other dipolar molecule gas at a relatively low gas pressure inside the cavity 125. Non-limiting examples of suitable electrical dipolar material gases include water, acetonitrile ($CH_3CN$) and hydrogen cyanide (HCN). As shown in FIG. 6, the clock generator 500 further includes a transceiver 600 with a transmit output 633 for providing an electrical transmit signal (TX) to the vapor cell 505, as well as a receiver input 638 for receiving an electrical input signal (RX) from the vapor cell 525. The rotational transition vapor cell 525 does not require optical interrogation, and instead operates through electromagnetic interrogation via the transmit and receive signals (TX, RX) provided by the transceiver 600.

The sealed cavity 508 includes a conductive interior cavity surface, as well as first and second non-conductive apertures 515 and 517 formed in the interior cavity surface for providing an electromagnetic field entrance and an electromagnetic field exit, respectively. In one example, the apertures 515, 517 magnetically couple into the TE10 mode of the cavity 508. In other examples, the apertures 515, 517 excite higher order modes. First and second conductive coupling structure 520 and 525 are formed on an outer surface of the vapor cell 505 proximate the first and second non-conductive aperture 515 and 517, respectively. The coupling structures 520, 525 may be the antenna(s) described above and may comprise a conductive strip formed on a surface of one of the substrates forming the cell 505. Each coupling structure 520, 525 may overlie and cross over the corresponding non-conductive aperture 515, 517 for providing an electromagnetic interface to couple a magnetic field in to (based on the transmit signal TX from the transceiver output 633) the cavity 508 or from the cavity to the transceiver RX input 638 The proximate location of the conductive coupling structures 520, 525 and the corresponding non-conductive apertures 515, 525 advantageously provides electromagnetically transmissive paths through the second or upper substrate 106, which can be any electromagnetically transmissive material.

The transceiver circuit 600 in certain implementations is implemented on or in an integrated circuit (not shown), to which the vapor cell 505 is electrically coupled for transmission of the TX signal via the output 633 and for receipt of the RX signal via the input 638. The transceiver 600 is operable when powered for providing an alternating electrical output signal TX to the first conductive coupling structure 520 for coupling an electromagnetic field to the interior of the cavity 508, as well as for receiving the alternating electrical input signal RX from the second conductive coupling structure 525 representing the electromagnetic field received from the cavity 508. The transceiver circuit 600 is operable for selectively adjusting the frequency of the electrical output signal TX in order to reduce the electrical input signal RX by interrogation to operate the clock generator 500 at a frequency which substantially maximizes the molecular absorption through rotational motor state transitions, and for providing a reference clock signal REF_CLK at the frequency of the TX output signal.

In certain examples, the transceiver 600 includes a signal generator 602 with an output 633 electrically coupled with the first conductive coupling structure 520 for providing the alternating electrical output signal TX, and for providing the reference clock signal REF_CLK at the corresponding transmit output frequency. The transceiver 600 also includes a lock-in amplifier circuit 606 with an input 638 coupled from the second conductive coupling structure 525 for receiving the RX signal. The lock-in amplifier operates to provide an error signal ERR representing a difference between the RX signal and the electrical output signal TX. In one example, the lock-in amplifier 606 provides the error signal ERR as an in-phase output, and the error signal ERR is used as an input by a loop filter 604 to provide a control output signal (CO) to the signal generator 602 for selectively adjusting the TX output signal frequency to maintain this frequency at a peak absorption frequency of the dipolar molecular gas inside the sealed interior of the cavity 508. In some examples, the RF power of the TX and RX loop is controlled so as to avoid or mitigate stark shift affects.

The electromagnetic coupling via the non-conductive apertures 520, 525 and corresponding conductive coupling structures 515, 517 facilitates electromagnetic interrogation of the dipolar gas within the cell cavity 508. In one non-limiting form of operation, the clock generator 500 operates with the signal generator 602 transmitting alternating current (AC) TX signals at full transmission power at various frequencies within a defined band around a suspected quantum absorption frequency at which the transmission efficiency of the vapor cell 505 is minimal (absorption is maximal). For example, the quantum absorption frequency associated with the dipolar water molecule is 183.31 GHz. When the system operates at the quantum frequency, a null or minima is detected at the receiver via the lock-in amplifier 606, which provides the error signal ERR to the loop filter 604 for regulation of the TX output signal frequency via the control output CO signal provided to the signal generator 602. The rotational quantum frequency of the dipolar molecule gas in the vapor cell cavity 508 is generally stable with respect to time (does not degrade or drift over time), and is largely independent of temperature and a number of other variables.

In one embodiment, the signal generator 602 initially sweeps the transmission output frequency through a band known to include the quantum frequency of the cell 505 (e.g., transitioning upward from an initial frequency below the suspected quantum frequency, or initially transitioning downward from an initial frequency above the suspected quantum frequency, or other suitable sweeping technique or approach). The transceiver 600 monitors the received energy via the input 638 coupled with (e.g., electrically connected to) the second conductive coupling structure 525 in order to identify the transmission frequency associated with peak absorption by the gas in the cell cavity 508 (e.g., minimal reception at the receiver). Once the quantum absorption frequency is identified, the loop filter 604 moves the source signal generator transmission frequency close to that absorption frequency (e.g., 183.31 GHz), and modulates the signal at a very low frequency to regulate operation around the null or minima in the transmission efficiency representing the ratio of the received energy to the transmitted energy. The loop filter 604 provides negative feedback in a closed loop operation to maintain the signal generator 602 operating at a TX frequency corresponding to the quantum frequency of the cavity dipolar molecule gas.

In steady state operation, the lock-in amplifier 606 and the loop filter 604 maintain the transmitter frequency at the peak absorption frequency of the cell gas. In one non-limiting example, the loop filter 604 provides proportional-integral-derivative (PID) control using a derivative of the frequency error as a control factor for lock-in detection and closed loop regulation. At the bottom of the null in a transmission coefficient curve, the derivative is zero and the loop filter 604 provides the derivative back as a direct current (DC) control output signal CO to the signal generator 602. This closed loop operates to keep the signal generator transmission output frequency at the peak absorption frequency of the cell gas using lock-in differentiation based on the RX signal received from the cell 508. The REF_CLK signal from the signal generator 602 is the TX signal clock and can be provided to other circuitry such as frequency dividers and other control circuits requiring use of a clock.

Modifications are possible in the described embodiments, and other embodiments are possible, within the scope of the claims.

What is claimed is:

1. A device, comprising:
    a first substrate having opposite first and second sides, a cavity extending from the second side of the first substrate through the first substrate to the first side of the first substrate;
    a first oxide layer on the first side of the first substrate;
    a metal layer on the first oxide layer;
    a second oxide layer on the metal layer, the cavity extending from the first side of the first substrate through the first oxide layer and through the metal layer to the second oxide layer;
    an insulative layer on the second oxide layer;
    an antenna on the insulative layer;
    a second substrate; and
    a structure that seals the cavity by bonding the second substrate to the first substrate.

2. The device of claim 1, further comprising an electronic bandgap structure on the insulative layer.

3. The device of claim 1, wherein the cavity contains dipolar molecules.

4. The device of claim 3, wherein the dipolar molecules are water molecules, and the cavity has a pressure of less than 0.15 mbars.

5. The device of claim 1, wherein the insulative layer includes at least one of glass, ceramic or, silicon.

6. The device of claim 1, wherein: the first substrate includes at least one of a semiconductor wafer, a ceramic or a metal; and the second substrate includes at least one of a semiconductor wafer, a ceramic or a metal.

7. The device of claim 1, wherein the insulative layer includes glass, the first substrate includes a first semiconductor wafer, and the second substrate includes a second semiconductor wafer.

8. The device of claim 1, wherein:
    the antenna is a first antenna;
    the device includes an amplifier, a filter, a signal generator, and a second antenna on the insulative layer;
    the signal generator is coupled to the first antenna and is configured to generate a transmit signal to the first antenna;
    the amplifier is coupled to the second antenna and is configured to generate an error signal based on a receive signal from the second antenna and the transmit signal; and
    the filter is coupled to the amplifier and to the signal generator, and is configured to generate a control output signal, based on the error signal, to adjust a frequency of the transmit signal generated by the signal generator.

9. The device of claim 1, wherein the metal layer is a first metal layer, and the bonding structure includes a second metal layer.

10. A device, comprising:
    a first semiconductor substrate having opposite first and second sides, a cavity extending from the second side of the first semiconductor substrate through the first semiconductor substrate to the first side of the first semiconductor substrate;
    a first oxide layer on the first side of the first semiconductor substrate;
    a metal layer on the first oxide layer;
    a second oxide layer on the metal layer, the cavity extending from the first side of the first semiconductor substrate through the first oxide layer and through the metal layer to the second oxide layer;
    a glass sheet on the second oxide layer;
    first and second antennas on the glass sheet;
    a second semiconductor substrate;
    a structure that seals the cavity by bonding the second semiconductor substrate to the first semiconductor substrate; and
    a transceiver electrically coupled to the first and second antennas, the transceiver configured to inject a transmit signal into the cavity through the first antenna, generate an error signal based on a receive signal from the second antenna and the transmit signal, and dynamically adjust a frequency of the transmit signal based on the error signal;
    the cavity containing dipolar molecules and having an internal pressure of less than 0.15 mbars.

11. The device of claim 10, wherein the transceiver includes:
    a signal generator coupled to the first antenna, the signal generator configured to generate the transmit signal;
    an amplifier coupled to the second antenna, the amplifier configured to generate the error signal; and
    a loop filter coupled to the amplifier and to the signal generator, the loop filter configured to generate a control output signal to the signal generator based on the error signal.

12. The device of claim 10, wherein the metal layer is a first metal layer, and the bonding structure includes a second metal layer.

* * * * *